United States Patent
Park et al.

(10) Patent No.: US 9,122,543 B2
(45) Date of Patent: Sep. 1, 2015

(54) DATA PROCESSING METHOD, APPARATUS AND COMPUTER PROGRAM PRODUCT FOR SIMILARITY COMPARISON OF SOFTWARE PROGRAMS

(71) Applicant: Foundation of Soongsil University—Industry Cooperation, Seoul (KR)

(72) Inventors: Young Su Park, Seoul (KR); Ji Man Hong, Seoul (KR); Sang Hoon Choi, Gyeonggi-Do (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/505,005

(22) Filed: Oct. 2, 2014

(65) Prior Publication Data

US 2015/0121397 A1   Apr. 30, 2015

(30) Foreign Application Priority Data

Oct. 28, 2013  (KR) ................. 10-2013-0128601
Nov. 25, 2013  (KR) ................. 10-2013-0144061

(51) Int. Cl.
*G06F 9/54* (2006.01)
(52) U.S. Cl.
CPC ..................................... *G06F 9/54* (2013.01)
(58) Field of Classification Search
None
See application file for complete search history.

(56) References Cited

U.S. PATENT DOCUMENTS

| | | | |
|---|---|---|---|
| 2001/0005207 A1* | 6/2001 | Muikaichi et al. | 345/467 |
| 2002/0124082 A1* | 9/2002 | San Andres et al. | 709/225 |
| 2004/0261024 A1* | 12/2004 | Storisteanu | 715/530 |
| 2007/0065018 A1* | 3/2007 | Thiagarajan | 382/232 |
| 2008/0178042 A1* | 7/2008 | Mochizuki et al. | 714/25 |
| 2009/0024555 A1* | 1/2009 | Rieck et al. | 706/54 |
| 2014/0208296 A1* | 7/2014 | Dang et al. | 717/123 |

OTHER PUBLICATIONS

Park et al., "An Effective API Log Extraction Scheme for Dynamic Binary Similarity Comparision", RACS '13 Proceedings of the 2013 Research in Adaptive and Convergent Systems, pp. 355-356. (Abstract included).
Hamou-Lhadj et al., "Compression Techniques to Simplify the Analysis of Large Execution Traces*", IEEE, 2002, pp. 1092-8138.

* cited by examiner

*Primary Examiner* — Tuan Dao
(74) *Attorney, Agent, or Firm* — Mintz Levin Cohn Ferris Glovsky and Popeo, P.C.; Kongsik Kim (57) ABSTRACT

A data processing method, apparatus, and computer program product for performing a similarity comparison between software programs are provided. An aspect of the invention provides a data processing method for performing a similarity comparison between two programs, where the data processing method includes: (a) extracting API names from each program and converting the API names to unique text sequences of a particular byte; (b) establishing a frequency table by counting a frequency of the extracted API names; (c) recording the API names converted into the unique text sequences in a log file in the order of extraction; and (d) saving the frequency table as a file and compressing the log file.

9 Claims, 9 Drawing Sheets

| Programs | File Size(KB) |
|---|---|
| EditPlus | 1,635 |
| MS Excel | 3,696 |
| MS Paint | 1,287 |
| Visual Studio 2008 | 2,997 |
| MS Word | 6,887 |

F-table

| converted API name | frequency |
|---|---|
| Ae | 31 |
| Gg | 20 |
| Ca | 12 |
| De | 34 |
| Aa | 31 |
| Bc | 20 |
| DD | 12 |
| ⋮ | ⋮ |

(a)

log file

| Programs 1 | Programs 2 | Cosine | K-gram |
|---|---|---|---|
| | | Reduced Time(%) | Reduced Time(%) |
| Filezilla 3.6.0 | Filezilla 2.2.32 | 99.90% | 13% |
| | Putty 0.52 | 99.84% | 11% |
| Akelpad 4.8.0 | Akelpad 4.0.0 | 99.85% | 13% |
| | Notepad 6.1 | 99.95% | 15% |
| Winamp 5.63 | Winamp 5.2 | 99.53% | 14% |
| | Alsong 2.76 | 99.93% | 17% |
| PotPlayer 1.5.36 | PotPlayer 1.5.35 | 99.90% | 17% |
| | WindowMediaPlayer 12.0.76 | 99.98% | 17% |

FIG. 8

| Programs | Reduced Size(%) | Programs | Reduced Size(%) |
|---|---|---|---|
| Filezilla 3.6.0 | 77% | Breadzip 4.0 | 74% |
| Filezilla 2.2.32 | 77% | Winamp 5.63 | 81% |
| Putty 0.52 | 78% | Winamp 5.2 | 81% |
| Akelpad 4.8.0 | 77% | Alsong 2.76 | 80% |
| Akelpad 4.0.0 | 77% | PotPlayer 1.5.36250 | 79% |
| Notepad 6.1 | 78% | PotPlayer 1.5.35491 | 82% |
| 7zip 9.22 | 77% | WindowMediaPlayer 12.0.76 | 82% |
| 7zip 4.65 | 77% | | |

FIG. 9

DATA PROCESSING METHOD, APPARATUS AND COMPUTER PROGRAM PRODUCT FOR SIMILARITY COMPARISON OF SOFTWARE PROGRAMS

CROSS-REFERENCE TO RELATED APPLICATIONS

This application claims the benefit of Korean Patent Application No. 10-2013-0128601 filed on Oct. 28, 2013 and Korean Patent Application No. 10-2013-0144061 filed on Nov. 25, 2013. The disclosures of the above patent applications are incorporated herein by reference in their entirety.

BACKGROUND

1. Technical Field

The present invention relates to a data processing method, apparatus, and computer program product for performing a similarity comparison between software programs.

2. Description of the Related Art

Advances in communication systems, including the Internet, have unwittingly led to rapid increases in software piracy.

The concept of software piracy encompasses the illegal copying of software for use or sale, as well as plagiarism or theft of software, which involves unauthorized use of some or all of the code forming a software program.

Methods of identifying software piracy can be classified into static analysis and dynamic analysis.

Static analysis may involve a method of identifying software piracy by analyzing the binary files of a software. As the amount of data that must be analyzed is relatively small, the analysis can be performed relatively easily.

However, since the content of binary files can be changed through source code obfuscation, it may be more difficult to identify an illegally copied software.

Dynamic analysis may involve a method of identifying software piracy by using the characteristics of changes that occur during the execution of a software. Although source code obfuscation may alter the code, the characteristics found during the execution of a software may remain unchanged, so that illegally copied software can be identified with greater accuracy.

However, the amount of data that is created during execution may be very large, and as such, the amount of data that must be analyzed may be significantly larger compared to the case of static analysis.

Despite these drawbacks, dynamic analysis is used more often, as it provides greater accuracy in identifying software piracy.

Figure 1:
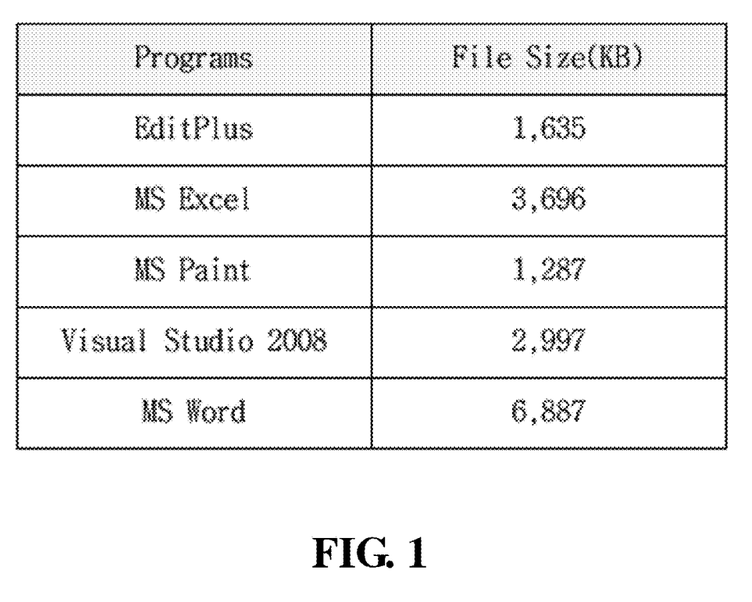
FIG. 1 illustrates the results of data extraction for identifying software piracy according to the related art.

FIG. 1 illustrates the results of data extraction for identifying software piracy according to the related art.

FIG. 1 corresponds to a case of identifying software piracy by using the characteristics of function call sequences of software programs. The results show function call data from execution to finish for Win32-based software programs.

From FIG. 1, it can be seen that the extraction of function call data results in more than 1 Mbyte of data extracted. Applying dynamic analysis to such data in order to identify software piracy can be very time consuming.

As such, research is under way aimed at reducing the time required for identifying software piracy by reducing the amount of data that has to be analyzed when applying a dynamic analysis technique.

SUMMARY

An aspect of the invention addresses the problem in the related art described above and aims to provide a way to reduce the amount of data that has to be analyzed when applying a dynamic analysis technique to identify software piracy.

To achieve the objective above, an aspect of the invention provides a data processing method for performing a similarity comparison between two programs, where the data processing method includes: (a) extracting API names from each program and converting the API names to unique text sequences of a particular byte; (b) establishing a frequency table by counting a frequency of the extracted API names; (c) recording the API names converted into the unique text sequences in a log file in the order of extraction; and (d) saving the frequency table as a file and compressing the log file.

In an embodiment of the invention, step (d) may include compressing the log file by using any one compression scheme of Repeated Call Compression (RCC), Repeated Call Pattern Compression (RCPC), and Pattern-set Replacement Compression (PRC).

Also, in an embodiment of the invention, step (a) may include extracting the API names through a detours library and converting the extracted API names into unique text sequences of 2 bytes composed of upper case and lower case alphabet letters.

Also, in an embodiment of the invention, the frequency table may be used for cosine similarity comparison and the log file may be used for k-gram similarity comparison, with one or more of the frequency table and the log file used for the similarity comparison between the two programs.

To achieve the objective above, an aspect of the invention provides a computer program product that includes a program of instructions for performing one of the data processing methods described above.

To achieve the objective above, an aspect of the invention provides a data processing apparatus for performing a similarity comparison between two programs, where the data processing apparatus includes: an API extraction part configured to extract API names from each program and convert the API names to unique text sequences of a particular byte; a frequency table establishment part configured to count a frequency of the extracted API names and establish a frequency table; a log file recording part configured to record the API names converted into the unique text sequences in a log file in an order of extraction; and a file processing part configured to save the frequency table as a file and compress the log file.

In an embodiment of the invention, the file processing part may compress the log file by using any one compression scheme of Repeated Call Compression (RCC), Repeated Call Pattern Compression (RCPC), and Pattern-set Replacement Compression (PRC).

Also, in an embodiment of the invention, the API extraction part may extract the API names through a detours library and may convert the extracted API names into unique text sequences of 2 bytes composed of upper case and lower case alphabet letters.

Also, in an embodiment of the invention, the frequency table may be used for cosine similarity comparison and the log file may be used for k-gram similarity comparison, with one or more of the frequency table and the log file used for the similarity comparison between the two programs.

Certain embodiments of the invention can be employed to reduce the amount of data subject to analysis for identifying software piracy.

Also, the time required for identifying software piracy can be reduced.

Also, in the context of increased infringement of software copyrights, an embodiment of the invention can provide useful resources with which to determine whether or not there is infringement.

It is to be appreciated that the advantageous effects of the present invention are not limited to the effects described above but encompass all effects that can be derived from the detailed description of the invention or from the elements disclosed in the scope of claims.

DETAILED DESCRIPTION

The present invention will be described below with reference to the accompanying drawings. However, the present invention can be implemented in several different forms and is not limited to the embodiments described herein.

In order to describe embodiments of the present invention with greater clarity, certain parts have been omitted in the drawings, and like reference numerals have been used for like parts throughout the specification.

In the specification, the description that a part is "connected" to another part refers not only to those cases in which the parts are "connected directly" but also to those cases in which the parts are "connected indirectly" by way of one or more other members interposed therebetween.

Also, the description that a part "includes" a component means that additional components may further be included and does not preclude the existence of other components unless specifically indicated.

Certain embodiments of the invention will now be described in more detail with reference to the accompanying drawings.

Figure 2:
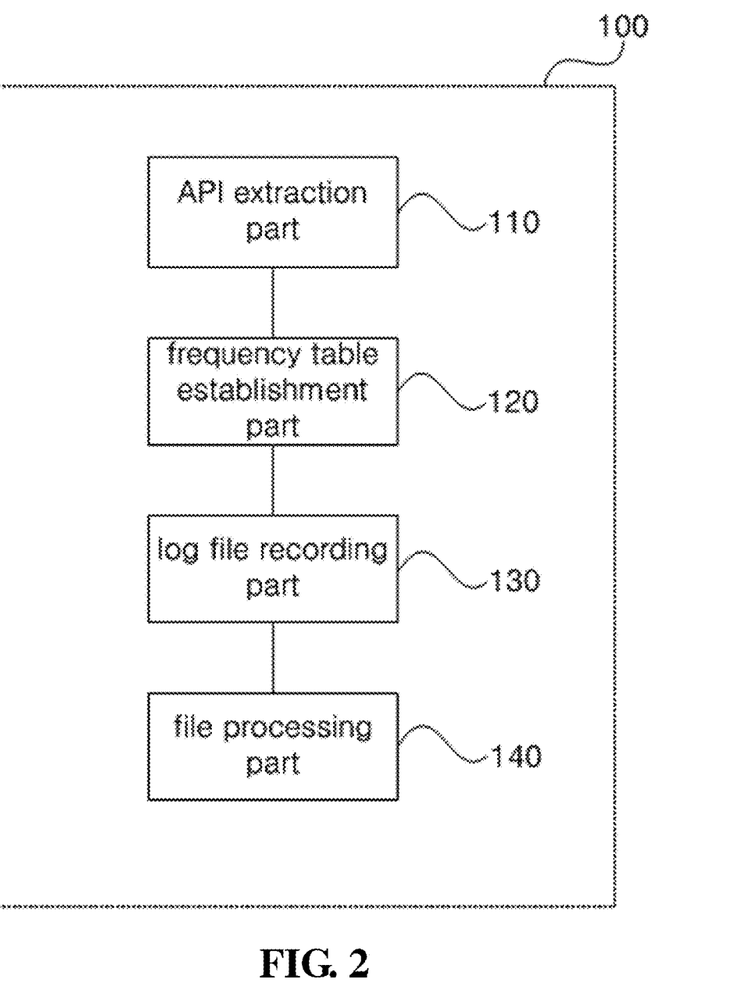
FIG. 2 is a block diagram illustrating the composition of a data processing apparatus for performing a similarity comparison between two software programs according to an embodiment of the invention.

FIG. 2 is a block diagram illustrating the composition of a data processing apparatus for performing a similarity comparison between two software programs according to an embodiment of the invention.

A data processing apparatus 100 for performing a similarity comparison between two software programs (hereinafter referred to simply as a "data processing apparatus") according to an embodiment of the invention can include an API extraction part 110, a frequency table establishment part 120, a log file recording part 130, and a file processing part 140.

Here, the "data processing" can be an operation of the data processing apparatus 100 for reducing the amount of data subject to analysis before performing a similarity comparison between two software programs. The data processing can be performed by the components of the data processing apparatus 100 described below.

Looking at each of the components, the API extraction part 110 may extract the API names from each program and convert the extracted API names into unique text sequences of a particular byte.

Here, the API extraction part 110 can extract the API names through a detours library, and can convert the extracted API names into unique text sequences of 2 bytes composed of upper case and lower case alphabet letters (e.g. "Aa", etc).

The process for converting into text sequences described above can be performed concurrently while the API names are extracted in the detours library, so that there may be no overhead incurred during the conversion process.

The frequency table establishment part 120 can establish a frequency table (hereinafter referred to as an "F-table") by counting the frequency of the API names extracted by the API extraction part 110.

Here, the "F-table" can include the names of the API's as converted into unique text sequences of a particular byte, and the frequencies of the respective API names. If an API name converted into a unique text sequence of a particular byte already exists in the F-table, then the frequency table establishment part 120 can increase the value representing the frequency of the corresponding API name, and if the API name does not already exist in the F-table, then the frequency table establishment part 120 can newly add the API name to the F-table (in the (n+1)-th row if there are n rows present) with a default value of 1 representing the frequency.

The F-table can be used later for cosine similarity comparison in the procedure for the similarity comparison between two programs.

The cosine similarity algorithm, which is applied in various fields, is a technique that involves calculating distances between vectors and presenting the results in terms of similarity.

A cosine similarity measurement method may be a method of measuring the similarity between two vectors by measuring the cosine angles between the two vectors, where two vectors are considered more similar if they are measured as pointing more in the same direction.

A more detailed description of the F-table will be provided later on with reference to FIG. 4.

The log file recording part 130 can record the API names, which have been converted into unique text sequences of a particular byte, in a log file in the order in which they were extracted.

The log file can be used later for k-gram similarity comparison in the procedure for the similarity comparison between two programs.

A k-gram similarity algorithm may be an algorithm for comparing the similarity of binary programs. A k-gram refers to a contiguous sequence of k commands that can be extracted from a software program.

To compare two programs, the sets of k-grams extracted from the target programs can be compared with each other to derive the similarity between the two programs.

A more detailed description of the log file will be provided later on with reference to FIG. 4.

The similarity comparison between two programs can employ one or more of the F-table and the log file.

The file processing part 140 can save the F-table established by the frequency table establishment part 120 as a file and can compress the log file recorded by the log file recording part 130.

Here, the file processing part 140 can compress the log file by using any compression scheme from among Repeated Call Compression (RCC), Repeated Call Pattern Compression (RCPC), and Pattern-set Replacement Compression (PRC), to thereby reduce the amount of data targeted for comparison when comparing the similarity of two programs.

When selecting the compression scheme, the file processing part 140 can consider and select a continuous compression scheme that has a relatively high rate of compression with respect to compression speed, and can compress the log file by using the Repeated Call Pattern Compression (RCPC) scheme with greater priority from among the compression schemes described above.

A more detailed description of the compression schemes above will be provided later on with reference to FIG. 5 through FIG. 7.

The F-table files and the compressed log files extracted from the two programs by the data processing apparatus 100 can be transmitted to a similarity comparison apparatus (not shown), which can compare the similarity of the two programs by using either or both of the F-table files and the compressed log files.

Figure 3:
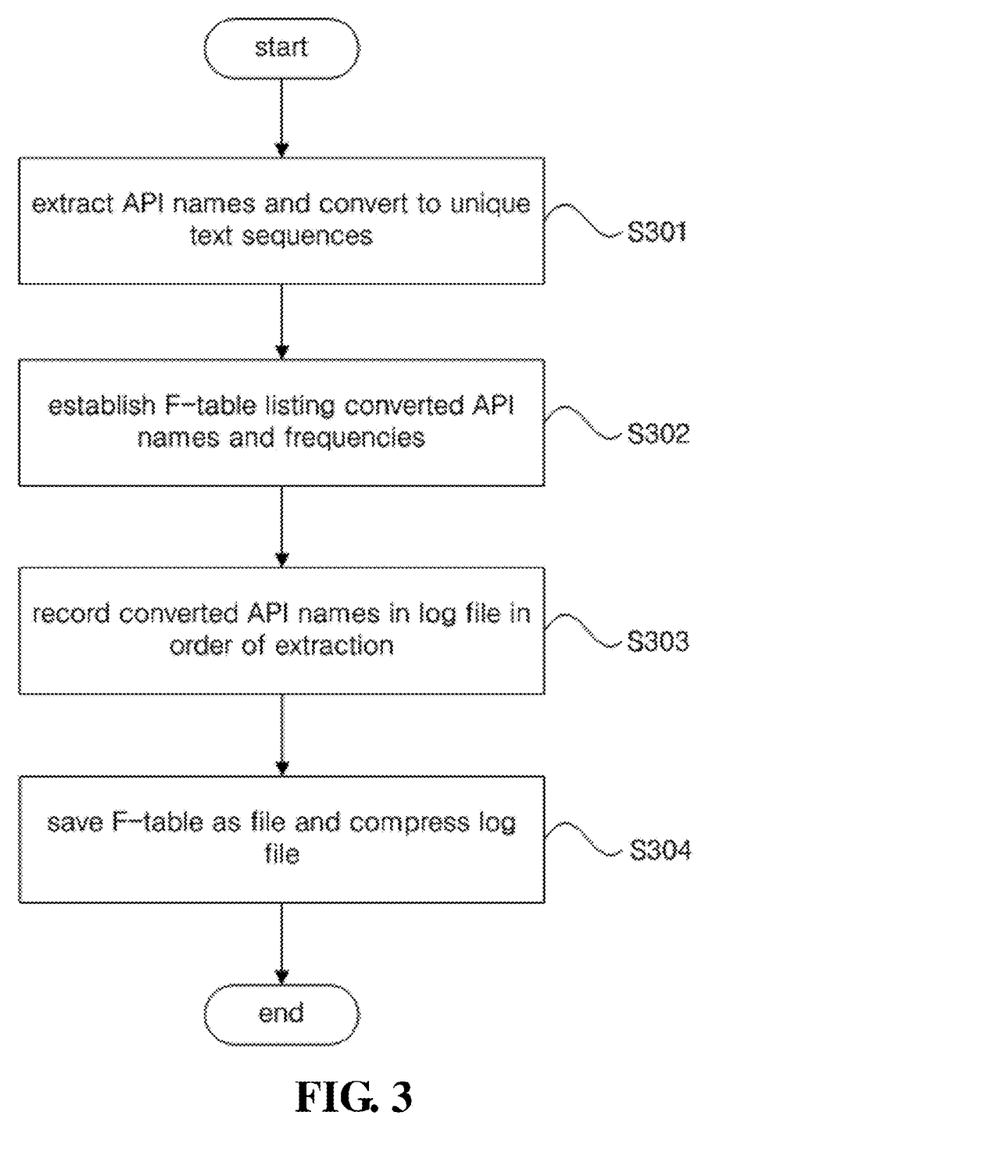
FIG. 3 is a flowchart illustrating the data processing procedures for a similarity comparison between two software programs according to an embodiment of the invention.

FIG. 3 is a flowchart illustrating the data processing procedures for a similarity comparison between two software programs according to an embodiment of the invention.

Each of the operations illustrated in FIG. 3 can be performed by a computer program product installed on a data processing apparatus 100. In the following, each procedure of FIG. 3 will be described as being performed by the data processing apparatus 100.

The data processing apparatus 100 may extract API names from each program by using a detours library, and may convert the extracted API names into unique text sequences of 2 bytes composed of upper case and lower case alphabet letters (S301).

After operation S301, the data processing apparatus 100 may count the frequencies of the API names extracted in operation S301 to establish an F-table (S302).

The "F-table" can include the names of the API's as converted into unique text sequences of a particular byte, and the frequencies of the respective API names. The F-table can also be used for cosine similarity comparison.

After operation S302, the data processing apparatus 100 may record the API names converted in operation S201 in a log file (S303) in the order in which they were extracted.

The log file can also be used for k-gram similarity comparison.

The data processing apparatus 100 can repeat operation S301 and operation S303 until all of the data that will be used for the similarity comparison between two programs is obtained (for example, from the beginning line to the end line of the source code of each program).

After operation S303, the data processing apparatus 100 may save the F-table as a file and compress the log file, and may transmit these files to a similarity comparison apparatus (not shown) (S304).

Here, the data processing apparatus 100 can compress the log file by using any compression scheme of Repeated Call Compression (RCC), Repeated Call Pattern Compression (RCPC), and Pattern-set Replacement Compression (PRC), and can compress the log file by using the Repeated Call Pattern Compression (RCPC) scheme with greater priority from among the above compression schemes.

When selecting the compression scheme, a continuous compression scheme that has a relatively high rate of compression with respect to compression speed can be considered and selected.

Figure 4:
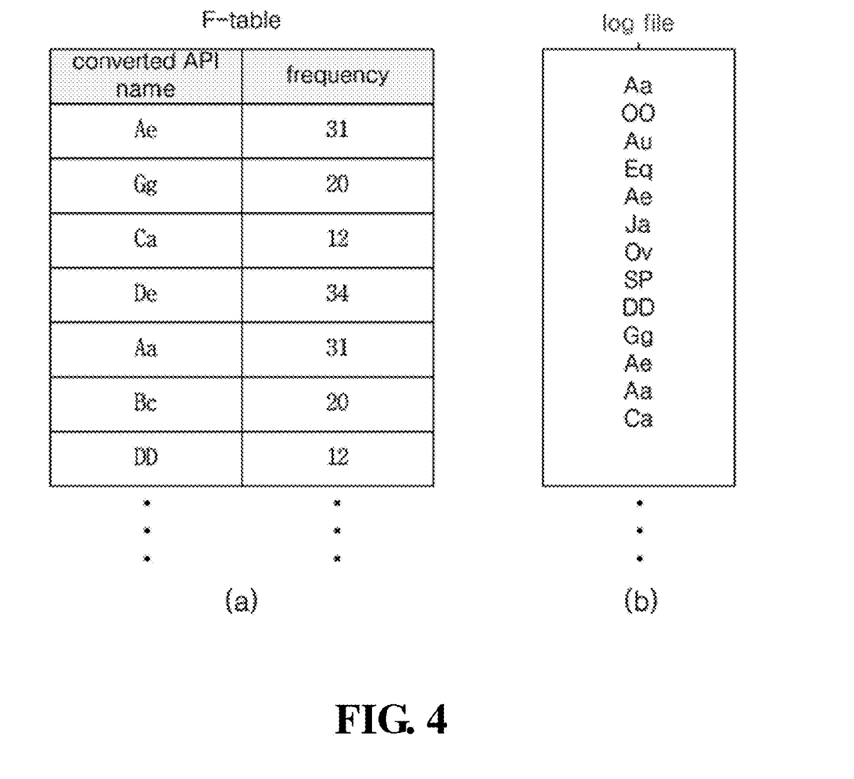
FIG. 4 illustrates a frequency table and log files according to an embodiment of the invention.

FIG. 4 illustrates a frequency table and log files according to an embodiment of the invention.

FIG. 4 shows an example of an F-table, indicated by (a), listing the unique text sequences (the converted API names) of 2 bytes composed of upper case and lower case alphabet letters as well as the frequencies in which the corresponding API names appear in a program.

FIG. 4 also shows an example of a log file, indicated by (b), listing the 2-byte unique text sequences (converted API names) in the order in which they were extracted from the program.

The names of the API's and their frequencies of appearance included in the F-table and the order of appearance of the API's included in the log file can be used effectively in a similarity comparison between two programs. The log files in which the names of the API's are recorded repeatedly can be compressed according to a particular scheme, so that the amount of data subject to the similarity comparison between two programs can be significantly reduced.

Figure 5:
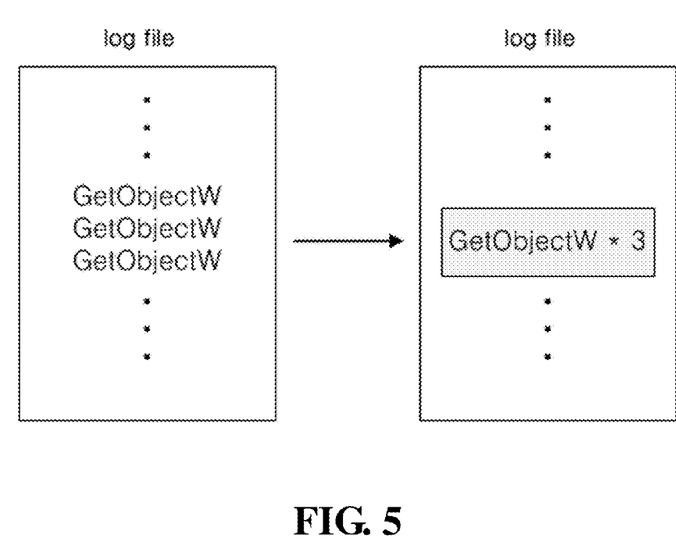
FIG. 5 illustrates a compression technique according to an embodiment of the invention.

FIG. 5 illustrates a compression technique according to an embodiment of the invention.

For easier understanding, FIG. 5 is described using the original API names instead of the unique text sequences of a particular byte.

The compression technique represented in FIG. 5 is the Repeated Call Compression (RCC) scheme, in which the data that appears repeatedly is combined into one set and modified with "* repetition number".

For example, as illustrated in FIG. 5, if GetObjectW is repeated three times in a log file, then the triply repeated GetObjectW can be changed to "GetObjectW*3".

The average compression speed for an RCC scheme is 2 Mbyte/s.

Figure 6:
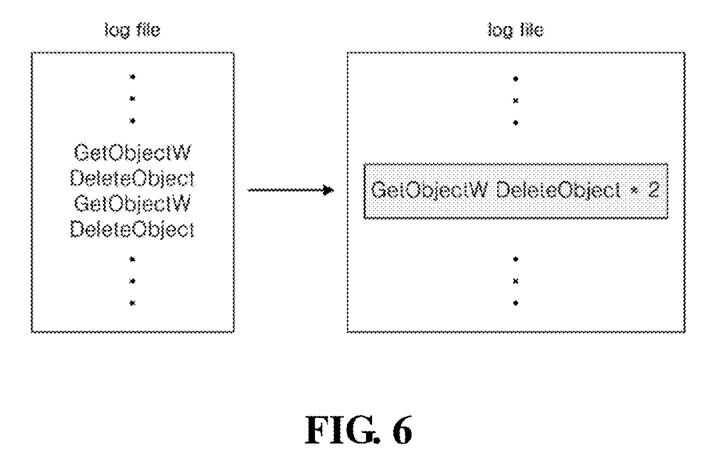
FIG. 6 illustrates a compression technique according to another embodiment of the invention.

FIG. 6 illustrates a compression technique according to another embodiment of the invention.

For easier understanding, FIG. 6 is described using the original API names instead of the unique text sequences of a particular byte.

The compression technique represented in FIG. 6 is the Repeated Call Pattern Compression (RCPC) scheme, in which two or more sets of data that appear repeatedly in the same order are combined into one and modified with "* repetition number".

For example, as illustrated in FIG. 5, if GetObjectW, DeleteObject, GetObjectW, DeleteObject are repeated in the same order in a log file, then the data can be changed to "GetObjectW DeleteObject*2".

The RCPC scheme can be described with levels according to the number of data sets that are repeated in the same order. The example illustrated in FIG. 6 has two sets of data repeated in the same order and thus corresponds to "level 2".

Three sets of data repeated in the same order would correspond to "level 3", while four sets of data repeated in the same order would correspond to "level 4".

Each level can include compression of lower levels (for example, level 3 compression can be performed after level 2 compression), and the average compression speeds are 1 Mbyte/s (level 2), 541 Kbyte/s (level 3), and 328 Kbyte/s (level 4).

Figure 7:
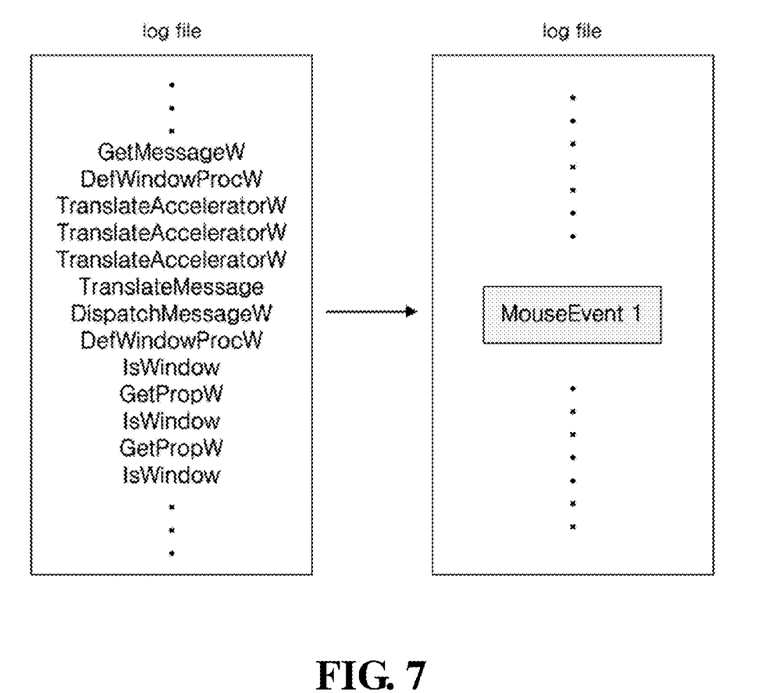
FIG. 7 illustrates a compression technique according to still another embodiment of the invention.

FIG. 7 illustrates a compression technique according to still another embodiment of the invention.

For easier understanding, FIG. 7 is described using the original API names instead of the unique text sequences of a particular byte.

The compression technique represented in FIG. 7 is the Pattern-set Replacement Compression (PRC) scheme, which utilizes a defined pattern set.

The PRC scheme defines a pattern set for a set of data that occurs in a certain order, assigns a particular name to the pattern set thus defined, and replaces the pattern set with the particular name.

For example, if a set of data is recorded in a pattern in the log file, as illustrated in FIG. 7, this set of data can be defined as a pattern set and assigned a particular name, such as "MouseEvent1".

That is, when a Mouse Event 1 (e.g. a mouse right click, etc.) occurs and a multiple number of API's are called constantly according to a particular pattern, the corresponding data can be defined as one pattern set, which can be referred to by the name "MouseEvent1".

The average compression speed for a PRC scheme may vary according to the number of pattern sets.

Figure 8:
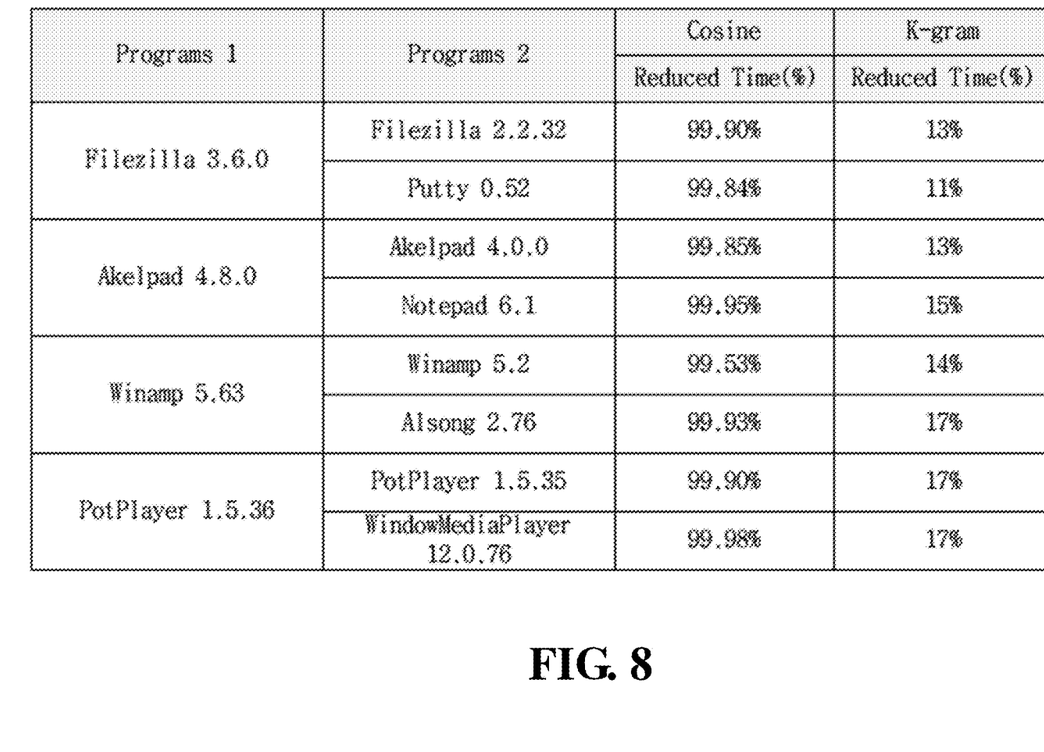
FIG. 8 shows test results for changes in size of log files according to an embodiment of the invention.

FIG. 8 shows test results for changes in size of log files according to an embodiment of the invention.

The two programs compared are as shown in FIG. 8, and the results are shown for cosine similarity comparison, which uses F-tables, and for k-gram similarity comparison, which uses compressed log files. It can be seen that an embodiment of the invention can provide a significant improvement in performance compared to similarity techniques based on the related art, providing at most 99% time reduction for cosine similarity comparison and at most 17% time reduction for k-gram similarity comparison.

Figure 9:
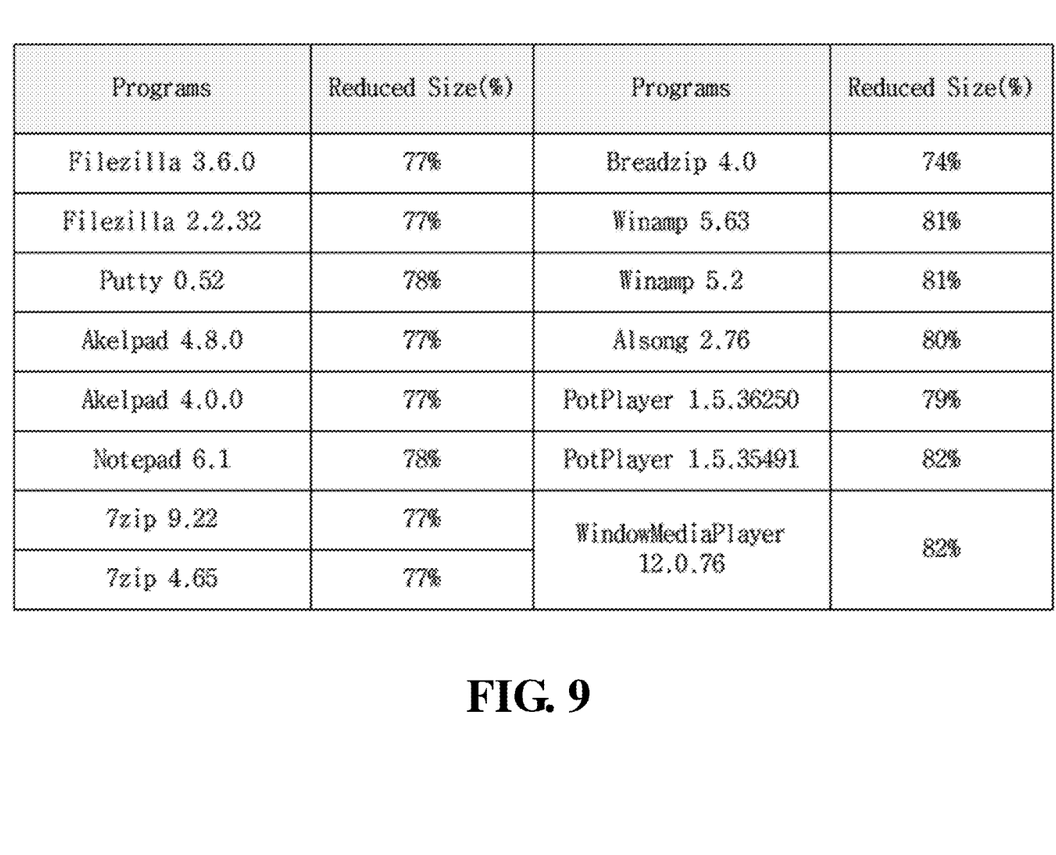
FIG. 9 shows the results of size changes due to the compression of log files according to an embodiment of the invention.

FIG. 9 shows the results of size changes due to the compression of log files according to an embodiment of the invention.

The test results in FIG. 9 can be used for comparing the similarity comparison performance between an embodiment of the invention and a technique based on the related art.

That is, after extracting the API names from each program, converting the API names into unique text sequences of a particular byte, and recording the API names converted into unique text sequences in a log file in the order of extraction, when the log files are compressed by a compression scheme such as Repeated Call Pattern Compression (RCPC), it can be seen in FIG. 9 that a maximum of 82% in size reduction can be obtained according to the software program.

As was described with reference to FIG. 1, a problem found in the related art is that, when performing a similarity comparison between two programs, the amount of data subject to comparison may incur a great load, directly affecting the time required for performing a dynamic analysis.

However, certain embodiments of the present invention, as described above, can considerably reduce the amount of data subject to comparison during a similarity comparison between two programs, to resolve the problem in the related art described above. In addition, the "F-tables" and the log files obtained by an embodiment of the invention can be utilized as useful resources by which to determine whether or not a program infringes a software copyright.

The embodiments of the present invention set forth above are for illustrative purposes. It would be appreciated by those of ordinary skill in the field of art to which the present invention pertains that the embodiments above can be easily modified to other specific implementations without departing from the technical spirit of the present invention and without changing the essential features of the present invention.

Thus, the embodiments described above are merely given as examples and do not limit the present invention.

For example, a component described as an integrated form can be used in a distributed form, while components described as being in a distributed form can be used coupled together.

The scope of the present invention is to be defined by the scope of claims set forth below, and it is to be appreciated that all variations and modifications which can be derived from the meaning and scope of the claims as well as their equivalents are encompassed by the scope of the present invention.

What is claimed is:

1. A data processing method for performing a similarity comparison between two programs, the data processing method comprising:
    (a) extracting an API name from each program and converting the API name to a unique text sequence of a particular byte;
    (b) establishing a frequency table by counting a frequency of the extracted API name;
    (c) recording the API names converted into the unique text sequences in a log file in an order of extraction; and
    (d) saving the frequency table as a file and compressing the log file,
    wherein the frequency table is used for cosine similarity comparison, the log file is used for k-gram similarity comparison, and one or more of the frequency table and the log file are used for the similarity comparison between the two programs.

2. The data processing method of claim 1, wherein said step (d) comprises:
    compressing the log file by using any one compression scheme of Repeated Call Compression (RCC), Repeated Call Pattern Compression (RCPC), and Pattern-set Replacement Compression (PRC).

3. The data processing method of claim 1, wherein said step (a) comprises:
    extracting the API names through a detours library and converting the extracted API names into unique text sequences of 2 bytes composed of upper case and lower case alphabet letters.

4. A non-transitory record medium readable by a data processing apparatus, tangibly embodying a program of instructions for performing the data processing method of claim 1.

5. A non-transitory record medium readable by a data processing apparatus, tangibly embodying a program of instructions for performing the data processing method of claim 2.

6. A non-transitory record medium readable by a data processing apparatus, tangibly embodying a program of instructions for performing the data processing method of claim 3.

7. A data processing apparatus for performing a similarity comparison between two programs, a processor controlling operation of the data processing apparatus, the data processing apparatus comprising:
    an API extraction part, implemented by the processor, configured to extract an API name from each program and convert the API name to a unique text sequence of a particular byte;
    a frequency table establishment part, implemented by the processor, configured to count a frequency of the extracted API name and establish a frequency table;

a log file recording part, implemented by the processor, configured to record the API names converted into the unique text sequences in a log file in an order of extraction; and a file processing part, implemented by the processor, configured to save the frequency table as a file and compress the log file, wherein the frequency table is used for cosine similarity comparison, the log file is used for k-gram similarity comparison, and one or more of the frequency table and the log file are used for the similarity comparison between the two programs.

8. The data processing apparatus of claim 7, wherein the file processing part compresses the log file by using any one compression scheme of Repeated Call Compression (RCC), Repeated Call Pattern Compression (RCPC), and Pattern-set Replacement Compression (PRC).

9. The data processing apparatus of claim 7, wherein the API extraction part extracts the API names through a detours library and converts the extracted API names into unique text sequences of 2 bytes composed of upper case and lower case alphabet letters.

\* \* \* \* \*